US010540403B1

(12) United States Patent
Coyle et al.

(10) Patent No.: US 10,540,403 B1
(45) Date of Patent: Jan. 21, 2020

(54) METHOD AND SYSTEM TO AUTOMATICALLY RESUME LINEAR REVIEW OF SEARCH RESULTS

(75) Inventors: Michael J. Coyle, Los Altos, CA (US); Gary S. Lehrman, Cupertino, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 355 days.

(21) Appl. No.: 13/324,903

(22) Filed: Dec. 13, 2011

Related U.S. Application Data

(60) Provisional application No. 61/537,816, filed on Sep. 22, 2011.

(51) Int. Cl.
*G06F 16/93* (2019.01)
*G06F 16/904* (2019.01)

(52) U.S. Cl.
CPC .......... *G06F 16/93* (2019.01); *G06F 16/904* (2019.01)

(58) Field of Classification Search
None
See application file for complete search history.

(56) References Cited

U.S. PATENT DOCUMENTS

| | | | |
|---|---|---|---|
| 5,920,854 A * | 7/1999 | Kirsch et al. | |
| 6,081,805 A * | 6/2000 | Guha | G06F 17/3033 |
| 6,226,629 B1 * | 5/2001 | Cossock | G06F 17/30949 |
| 6,285,994 B1 * | 9/2001 | Bui | G06F 17/30324 |
| | | | 707/745 |
| 6,633,867 B1 * | 10/2003 | Kraft et al. | 705/26.1 |
| 6,745,183 B2 * | 6/2004 | Nishioka et al. | |
| 6,904,430 B1 * | 6/2005 | Livshits | G06F 17/2211 |
| 7,395,514 B2 * | 7/2008 | Stern | 715/854 |
| 7,487,146 B2 * | 2/2009 | Friedman | |
| 7,739,274 B2 * | 6/2010 | Curtis et al. | 707/723 |
| 7,747,612 B2 * | 6/2010 | Thun et al. | 707/722 |
| 7,747,613 B2 * | 6/2010 | Freeman et al. | 707/722 |
| 7,747,614 B2 * | 6/2010 | Freeman et al. | 707/722 |
| 7,797,635 B1 * | 9/2010 | Denise | 715/738 |
| 7,908,559 B1 * | 3/2011 | Denise | 715/738 |
| 7,934,161 B1 * | 4/2011 | Denise | 715/738 |
| 8,244,997 B2 * | 8/2012 | Teranishi | G06F 21/564 |
| | | | 711/161 |
| 8,725,716 B1 * | 5/2014 | Riley | 707/707 |
| 2005/0021506 A1 * | 1/2005 | Sauermann | G06F 17/30451 |
| 2005/0060293 A1 * | 3/2005 | Day | G06F 17/30324 |
| 2005/0091204 A1 * | 4/2005 | Melman | 707/3 |
| 2006/0112085 A1 * | 5/2006 | Zijlstra et al. | 707/3 |
| 2007/0112817 A1 * | 5/2007 | Danninger | G06F 17/30867 |
| 2007/0162424 A1 * | 7/2007 | Jeh | G06F 17/30864 |
| 2007/0185826 A1 * | 8/2007 | Brice | G06F 17/30306 |
| 2008/0071769 A1 * | 3/2008 | Jagannathan | 707/5 |

(Continued)

*Primary Examiner* — Charles D Adams
(74) *Attorney, Agent, or Firm* — Patent Law Works LLP

(57) ABSTRACT

A computing system locates session state data associated with a preceding data review session corresponding to a user in response to a request to initiate a new data review session for the user. The session state data includes an identifier of a next document to be reviewed, and filter settings of the preceding data review session. The computing system locates the next document to be reviewed based on the session state data and provides the located next document to be reviewed in a graphical user interface when initiating the new data review session for the user. The new data review session is based on the filter settings in the session state data.

12 Claims, 15 Drawing Sheets

(56) References Cited

U.S. PATENT DOCUMENTS

| | | | |
|---|---|---|---|
| 2008/0172377 A1* | 7/2008 | Kapadia et al. | 707/5 |
| 2008/0270374 A1* | 10/2008 | Li | G06F 17/30495 |
| 2009/0112678 A1* | 4/2009 | Luzardo | G06N 5/02 |
| | | | 705/7.38 |
| 2010/0110099 A1* | 5/2010 | Averett et al. | 345/592 |
| 2010/0138653 A1* | 6/2010 | Spencer | G06F 21/6218 |
| | | | 713/167 |
| 2010/0250538 A1* | 9/2010 | Richards et al. | 707/737 |
| 2010/0250541 A1* | 9/2010 | Richards et al. | 707/737 |
| 2010/0250624 A1* | 9/2010 | Mayer | G06Q 10/10 |
| | | | 707/809 |
| 2010/0332489 A1* | 12/2010 | Benari | G06F 17/30864 |
| | | | 707/759 |
| 2011/0093471 A1* | 4/2011 | Brockway | G06F 17/30616 |
| | | | 707/747 |
| 2011/0191314 A1* | 8/2011 | Howes | G06Q 30/02 |
| | | | 707/706 |
| 2012/0109702 A1* | 5/2012 | Leung | G06Q 10/06 |
| | | | 705/7.15 |
| 2012/0254155 A1* | 10/2012 | Heim | G06F 17/30979 |
| | | | 707/721 |

\* cited by examiner

METHOD AND SYSTEM TO AUTOMATICALLY RESUME LINEAR REVIEW OF SEARCH RESULTS

CROSS-REFERENCE TO RELATED APPLICATIONS

This patent application claims the benefit under 35 U.S.C. § 119(e) of U.S. Provisional Application No. 61/537,816, filed Sep. 22, 2011, which is herein incorporated by reference.

TECHNICAL FIELD

Embodiments of the present invention relate to reviewing search results. Specifically, the embodiments relate to automatically resuming linear review of search results.

BACKGROUND

A common complaint among system administrators that coordinate the review of search results, for example, during electronic discovery (e-discovery), is the cost of the time spent by individual reviewers to login to the review platform and set up their digital workspace for the review. Each time a reviewer performs a login, for example, at the beginning of a day and during the day, the reviewer must perform a number of steps manually to return to the point where the reviewer was last reviewing in order to resume his/her review session.

SUMMARY

In one embodiment, a system for automatically resuming linear review of search results is described. An exemplary system may include a memory and a processing device that is coupled to the memory. In one embodiment, the system locates session state data associated with a preceding data review session corresponding to a user in response to a request to initiate a new data review session for the user. The session state data comprises an identifier of a next document to be reviewed, and filter settings of the preceding data review session. The system locates the next document to be reviewed based on the session state data and provides the located next document to be reviewed in a graphical user interface when initiating the new data review session for the user. The new data review session is based on the filter settings in the session state data.

In one embodiment, the new data review session is further based on highlighting settings in the session state data. In some embodiments of the exemplary system, the system locates first search results generated from a preceding search in the session state data, executes a search based on the session state data to generate second search results, and notifies a user of whether there are differences between the second search results and the first search results. In one embodiment, the system locates the next document to be reviewed by executing a search based on the session state data to generate new search results, sorting the new search results based on sort criteria and sort direction in the session state data, and locating the next document to be reviewed in the sorted new search results based on a display mode in the session state data.

In one embodiment, the system locates the next document to be reviewed in the sorted new search results by determining the display mode is a first mode wherein the next document to be reviewed is a document that was last viewed before a user ended a review session or determining the display mode is a second mode wherein the next document to be reviewed is a first document on a page of search results last viewed before the user ended a review session. In one embodiment, the session state data comprises back-end elements pertaining to a data review session. The back-end elements comprise at least one of a user identifier, a saved search identifier, search criteria, search filter settings, search highlighting settings, and document identifiers. In one embodiment, the session state data comprises user-facing elements pertaining to a data review session. The user-facing elements comprise at least one of sort criteria, sort direction, a display mode, and display parameters.

In addition, a non-transitory computer readable storage medium for automatically resuming linear review of search results is described. An exemplary non-transitory computer readable storage medium includes instructions that will cause a processor to locate session state data associated with a preceding data review session corresponding to a user in response to a request to initiate a new data review session for the user, locate the next document to be reviewed based on the session state data, and provide the located next document to be reviewed in a graphical user interface when initiating the new data review session for the user. The session state data comprises an identifier of a next document to be reviewed, and filter settings of the preceding data review session. The new data review session is based on the filter settings in the session state data.

Further, a method for automatically resuming linear review of search results is described. In one embodiment, a method comprises locating session state data associated with a preceding data review session corresponding to a user in response to a request to initiate a new data review session for the user, locating the next document to be reviewed based on the session state data, and providing the located next document to be reviewed in a graphical user interface when initiating the new data review session for the user. The session state data comprises an identifier of a next document to be reviewed, and filter settings of the preceding data review session. The new data review session is based on the filter settings in the session state data.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for resuming linear data review of search results. A user that is conducting a linear review of search results, for example, for electronic discovery (e-discovery), may wish to log out of a review session. The user may wish to resume a review of the search results based on where the user was at a point in time prior to logging out. A computer system can automatically set up a new review session based on the user's session state data prior to the user logging out. A computing system locates session state data associated with a preceding data review session corresponding to the user in response to a request to initiate a new data review session for the user. The session state data includes an identifier of a next document to be reviewed and filter settings of the preceding data review session. The computing system locates the next document to be reviewed based on the session state data and provides the located next document to be reviewed in a graphical user interface when initiating the new data review session for the user. The new data review session is based on the filter settings in the session state data.

Embodiments automate an entire process of resuming a user data review session substantially faster by intelligently capturing the state of a user reviewer workspace. Embodiments take substantially less time by automatically running a search, applying filters and highlights, and changing user settings. Embodiments can generate new search results and notify users of whether the new search results are different from the saved search results. Embodiments can automatically bring a reviewer user back to the document he/she was reviewing, even if the search results have changed.

Figure 1A:
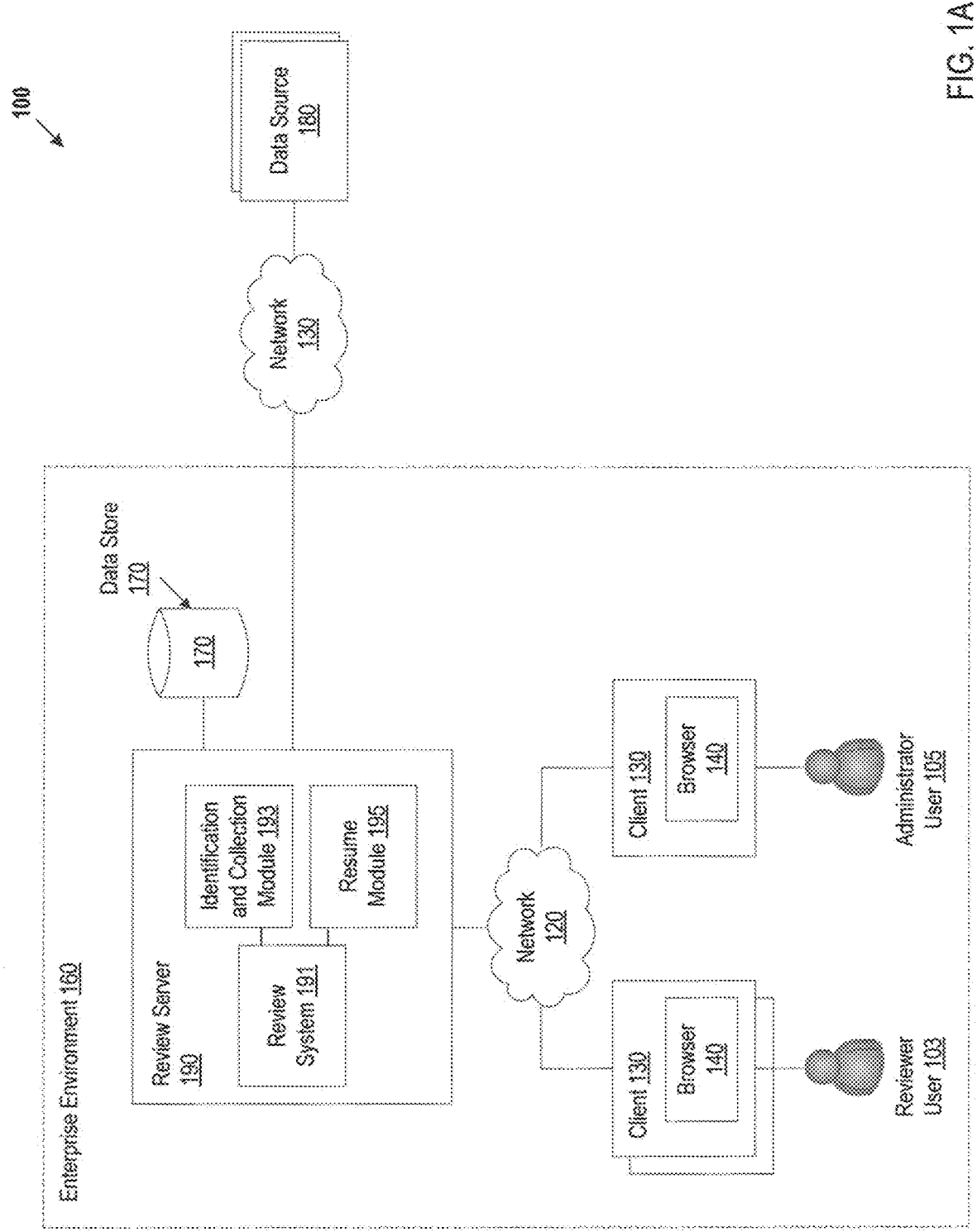
FIGS. 1A-B are network architectures in which embodiments may operate.

FIG. 1A is a network architecture 100 in which embodiments can be implemented. The network architecture 100 can include an environment, such as enterprise environment 160, which includes one or more review servers 190 and one or more clients 130 communicating via an enterprise network 120. The enterprise network 120 can be a local area network (LAN), a wireless network, a mobile communications network, a wide area network (WAN), such as the Internet, or similar communication system.

Figure 1B:
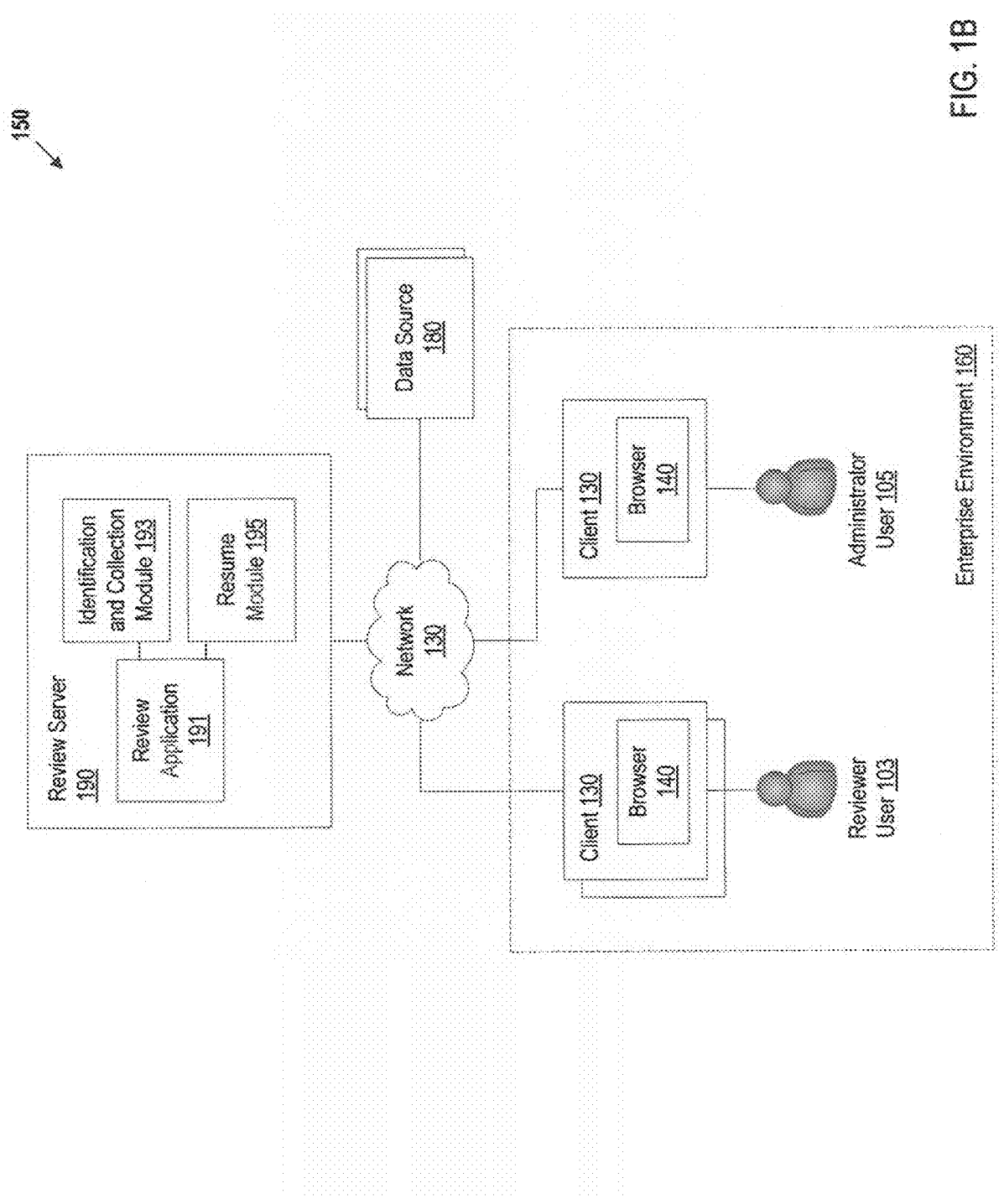

The review server 190 can include a review system 191 to allow one or more users 103 to review data. The review system 191 can be a review application hosted by the review server 190. In one embodiment, a review server 190 resides within an enterprise environment 160 and is coupled to an enterprise network 120. FIG. 1B is a network architecture 150 of another embodiment where the review server 190 resides outside of the enterprise environment 160 and can be accessed by enterprise users 103,105, for example, as a service via network 130. The network 130 can be a local area network (LAN), a wireless network, a mobile communications network, a wide area network (WAN), such as the Internet, or similar communication system.

Returning to FIG. 1A, in one embodiment, a review server 190 is deployed as a network appliance (e.g., a network router, hub, or managed switch). A review server 190 can be hosted by any type of computing device including network computing appliances, server computers, gateway computers, desktop computers, laptop computers, handheld computers or similar computing device. The users 103 can access the review system 191 via a browser 140, or similar application, on a client 130. A client 130 can be hosted by any type of computing device including server computers, gateway computers, desktop computers, laptop computers, mobile communications devices, cell phones, smart phones, hand-held computers, or similar computing device.

The reviewer users 103 can be users that perform a review of data, such as a linear review where each data item is reviewed one at a time. Examples of data items can include, and are not limited to, email messages, instant messages, text messages, voicemail messages, documents, database content, CAD/CAM files, web sites, loose files, archives, PST (personal storage table) files, container files, zip files, and any other electronically stored information. For brevity and simplicity, a document is used as an example of a data item throughout this document.

An administrator user 105, such as a review administrator, can access the review system 191 via the browser 140 to specify one or more data sources 180 to be examined. The administrator user 105 can specify the one or more data sources 180 for a particular review case. Examples of data sources 180 can include, and are not limited to, desktop computers, laptop computers, handheld computers, server computers, gateway computers, mobile communications devices, cell phones, smart phones, or similar computing device. The data sources 180 can reside in one or more environments outside of the enterprise environment 160 and be coupled to the review server 190 via a network 130. For example, data sources 180 may include an email server of CompanyA that is engaged in a law suit, personal computers of employees of CompanyB that is associated with the law suit, and mobile devices of employees of CompanyC that is associated with the law suit.

The review server 190 can include an identification and collection module 193 that is coupled to the review system 191 to locate the data sources 180, for example, as specified by the administrator user 105. The identification and collection module 193 can collect data to be reviewed from the located data sources 180. The identification and collection module 193 can include data crawlers to search for and collect the data. For example, the identification and collection module 193 collects email messages and attachments from an email server of CompanyA, email messages, attachments, text documents, instant messages, and images from personal computers of employees of CompanyB, and text messages, email messages, attachments, images, and voice messages from mobile devices of employees of CompanyC.

The identification and collection module 193 can store the collected data in one or more data stores 170 that are coupled to the review server 190. The identification and collection module 193 can process the stored data, such as create an index of the collected data. The collected data can be stored as one or more relational databases, spreadsheets, flat files, etc. The index can be stored as a text index in the data store 170. A data store 170 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The administrator user 105 can provide search parameters to the review system 191 and the review system 191 can execute a search of the collected data stored in the data store 170. The review system 191 can store the search results from the search in the data store 170. For example, the administrator user 105 can provide search parameters specifying that the review system 191 search for data items associated with EmployeeX, EmployeeY, and EmployeeZ. The search results can include documents associated with EmployeeX, EmployeeY, and EmployeeZ. A reviewer user 103 can also provide search parameters to the review system 191 and the review system 191 can execute a search of the collected data stored in the data store 170. For example, the administrator user 105 can assign keywords and/or date ranges to various reviewer users 103, which the reviewer users 103 can use to initiate a search.

In one embodiment, the review system 191 receives user input from the administrator user 105 to group documents in the data store 170. For example, the review system 191 can assign documents to one or more folders. A group of documents is hereinafter referred to as a 'review set.' In one embodiment, the review system 191 can automatically group documents into review sets based on configuration data that is stored in the data store 170.

The administrator user 105 can assign one or more review sets to one or more reviewer users 103. For example, a reviewer user 103, Jane Doe is assigned a review set containing 1000 documents. Each reviewer user 103 can login to the review system 191 to initiate an individual data review session to review the documents in the review set that is assigned to particular reviewer user 103. The reviewer users 103 can perform a linear review of the documents in a review set. For example, the reviewer users 103 may be attorneys using the review system 191 for e-discovery (electronic discovery). The reviewer users 103 can mark a document to categorize the document. Examples of categories for marking documents can include, and are not limited to, responsive, non-responsive, relevant, irrelevant, privileged, unreadable, and category unknown.

Marking a document can also be referred to as tagging a document or coding a document. Once a reviewer user 103 marks a document, the reviewer user 103 can examine a next document and make a marking decision for that next document. A reviewer user 103 can end his/her data review session, for example, by logging out of or timing out of the review system 191. Subsequently, a reviewer user 103 can resume his/her data review session, for example, by logging back into the review system 191.

The review server 190 can include a resume module 195 to return a reviewer user 103 to the document the reviewer user 103 was last viewing, in the context of the last search run by the administrator user 105. The resume module 195 can provide the next document to be reviewed by a reviewer user 103. The resume module 195 can save the state of the data review session for a reviewer user 103 prior to the reviewer user 103 ending his/her data review session in the data store 170 and can automatically configure a new data review session for the reviewer user 103 that allows the reviewer user 103 to resume his/her review based on the saved state. The resume module 195 can be coupled to the review system 191. The resume module 195 can save the search results associated with the data review session for a reviewer user 103 and can save the next document to be reviewed by the reviewer user 103 in the data store 170. When the reviewer user 103 initiates a new data review session, the resume module 195 can provide the next document to be reviewed in the new data review session.

The resume module 195 can also generate new search results when the reviewer user 103 initiates a new data review session and can notify a reviewer user 103 of whether the new search results are different from the saved search results. The resume module 195 can also notify the administrator user 105 of whether the new search results are different. For example, in e-discovery use cases, changes to the documents occur frequently, such as when new data is added to a matter on which review is underway. Changes can also occur if an administrator user 105 search query includes constraints based on work product such as tags applied to documents, and documents have been untagged or tagged, since the last search was run. The resume module 195 can bring a reviewer user 103 back to the document he/she was reviewing, even if the search results have changed.

Figure 2:
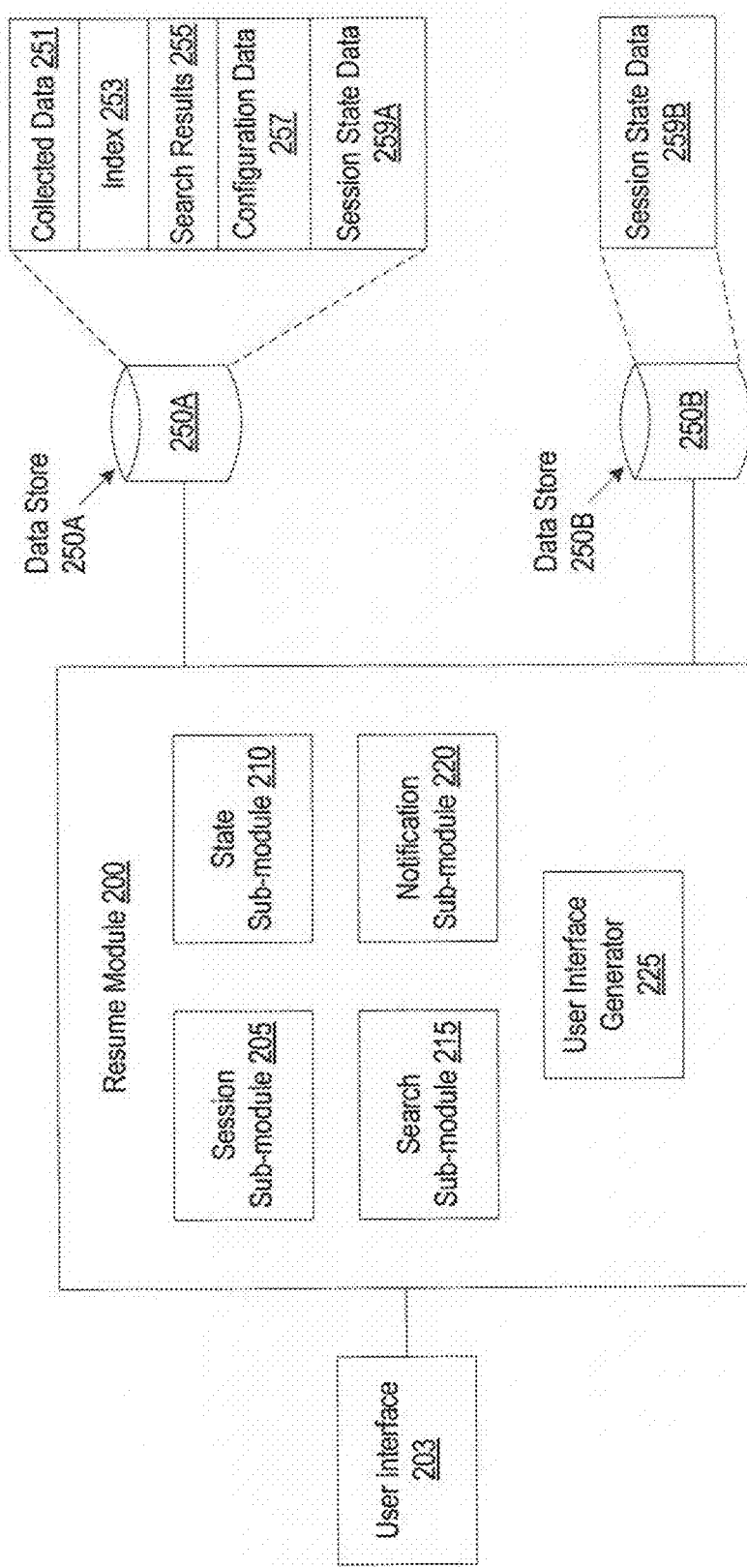
FIG. 2 is a block diagram of one embodiment of a resume module for resuming linear data review of search results.

FIG. 2 is a block diagram of one embodiment of a resume module 200 for resuming a linear review of search results. The resume module 200 may be the same as the resume module 195 hosted by a review server 190 in FIG. 1. The resume module 200 includes a session sub-module 205, a state sub-module 210, a search sub-module 215, a notification sub-module 220, and a user interface generator 225. The components can be combined together or separated in further sub-components, according to a particular embodiment.

The search sub-module 215 can be coupled to a data store 250A that stores collected data 251 from various data sources (e.g., data sources 180 in FIG. 1). The collected data 251 can be stored in one or more data stores 250A,B. The collected data 251 can be stored as one or more relational databases, spreadsheets, flat files, etc. The review system (e.g., review system 191 in FIG. 1) can assign each document in the collected data 251 a unique document identifier. The review system can index the documents using the unique document identifiers and stored an index 253 in a data store 250A. The index 253 can be stored as a text index. The collected data 251 is dynamically changing in that new documents can be added or removed from the collected data 251 during the lifecycle of a case. The content and/or markings of the documents in the collected data 251 can also change at any time during the lifecycle of a case. The assignment of documents in the collected data 251 to review sets can also dynamically change during the lifecycle of a case.

A data store 250A,B can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 11:
Figure 12:
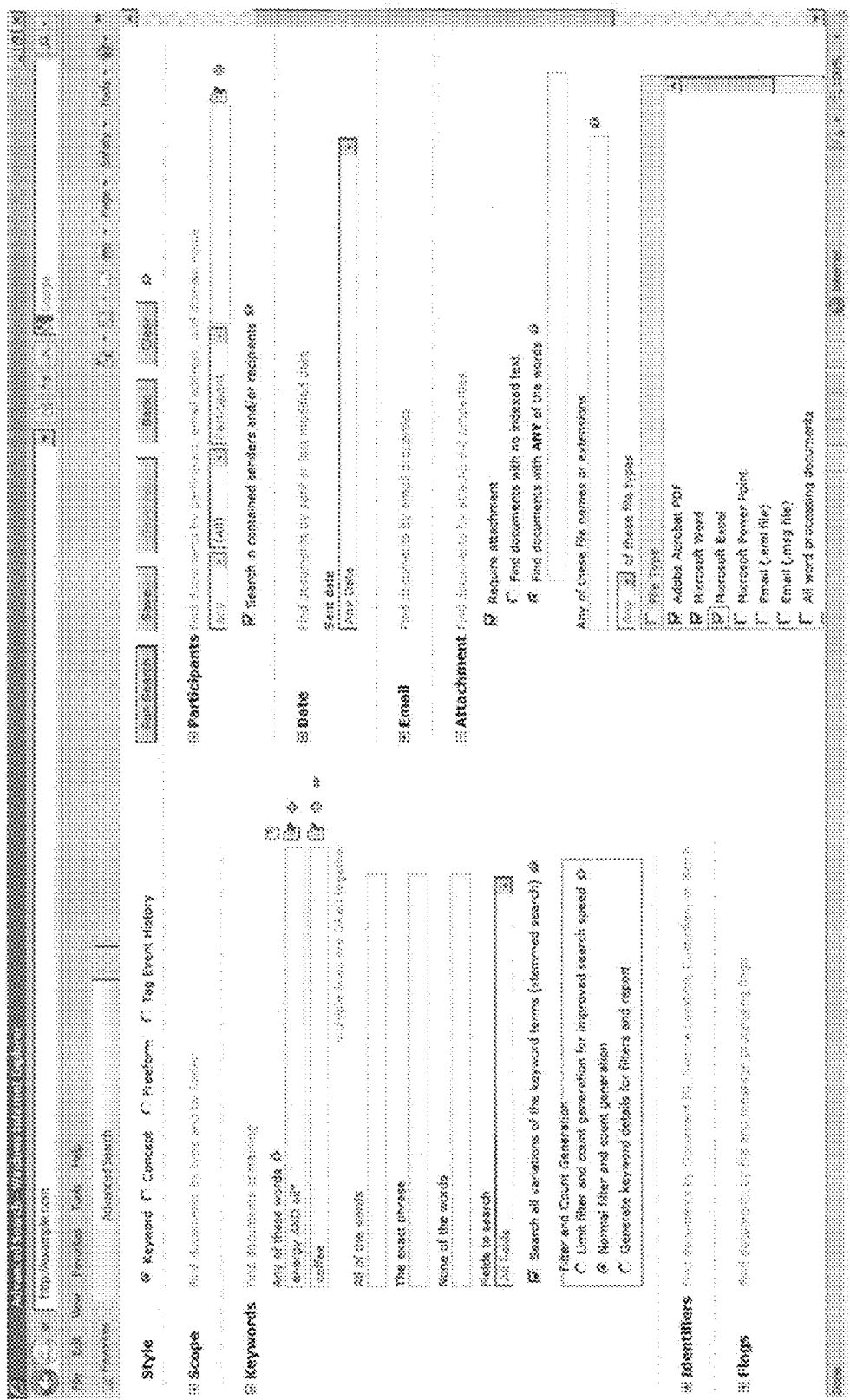

The search sub-module 215 can receive search parameters as user input, for example, from an administrator user and/or a reviewer user, via a user interface 203. The user interface 203 can be a graphical user interface (GUI). The user interface 203 can be a web-based GUI. The user interface (UI) generator sub-module 225 can generate a GUI to receive the user input. FIGS. 11-12 are example GUIs for receiving search parameters. The search sub-module 215 can execute a search of the collected data 251 based on the parameters. Examples of parameters can include, and are not limited to, keyword, date range, custodian, location of data, data type, languages, tags in folders, properties of a data item (e.g., email properties), etc. The search sub-module 215 can store the search results 255 from the search in the data store 250A. In one embodiment, the review system receives user input from the administrator user to group the documents from the search results 255 into review sets and assigns the review sets to reviewer users based on the user input.

The session sub-module 205 can initiate and close data review sessions, for example, by receiving requests and/or detecting session timeouts. The session sub-module 205 can determine when to preserve the state of a current data review session of a reviewer user. Each reviewer user can login to the review system to initiate an individual data review session to review the documents in the review set that is assigned to particular reviewer user. The session sub-module 205 can detect a trigger to preserve the state of the current data review session of a user. The session sub-module 205 can be coupled to a data store 250A that stores configuration data 257 defining when the session sub-module 205 is to preserve the state of a current data review session of a reviewer user. For example, the configuration data 257 can specify that when a data review session has timed out the session sub-module 205 is to preserve the state of the current data review session. The configuration data 257 can be defined by user input, such as input received from an administrator user and/or a reviewer user. In another example, the session sub-module 205 can be configured to prompt a user upon detecting a user is logging out of the review system to determine whether to preserve the state of the current data review session. For example, the UI generator 225 can generate a window (e.g., pop-up window) and present the window in the UI 203 to request whether to preserve the state of the current data review session.

The state sub-module 210 can capture the state of a current data review session by collecting characteristics of the data review session and storing the characteristics as session state data 259A,B in one or more data stores 250A,B that are coupled to the state sub-module 210. Examples of characteristics can include, and are not limited to, a user identifier, a case identifier of the case in which a user is currently reviewing, review system back-end elements, and review system user-facing elements. One embodiment of storing back-end elements and user-facing elements is described in greater detail below in conjunction with FIG. 4.

The data stores 250A,B can store session state data 259A,B for more than one reviewer user. A reviewer user can have more than one set of session state data 259A,B. One embodiment of a method for preserving session state data of a current data review session for a reviewer is described in greater detail below in conjunction with FIG. 4. The state sub-module 210 can search one or more data stores that are coupled to the state sub-module 210 and store data pertaining to the characteristics being captured. For example, the state sub-module 210 can obtain a user ID and a case ID from one or more data stores that store login data and case data.

In one embodiment, the session state data 259A,B is stored as elements in one or more databases. For example, the state sub-module 210 stores at least a portion of the session state data (e.g., session state data 259A) in a master case database in data store 250A and at least a portion of the session state data (e.g., session state data 259B) in a case database. One embodiment of storing session state data in more than one database is described in greater detail below in conjunction with FIG. 4.

The state sub-module 210 can store session state data 251A,B in a compressed data structure. For example, the state sub-module 210 can generate a bit map, which is a compressed data structure comprised of a segmented set of bit sets, of the document IDs in the complete set of document identifiers that comprise the set of search results.

The state sub-module 210 can determine whether there is session state data 259A,B for a particular user already stored in a data store 250A,B, for example, when the session sub-module 205 detects a request to initiate a new data review session for a reviewer user, such as a user login request. The state sub-module 210 can locate the session state data 259A,B that is associated with the preceding data review session for the reviewer user in the request.

The state sub-module 210 can determine whether to resume the state for a new data review session for a user. The state sub-module 210 be coupled to a data store 250A that stores configuration data 257 defining when the state sub-module 210 is to resume the state for a new data review session for a user based on the session state data 259A,B. For example, the configuration data 257 can specify that when a new data review session is requested the state sub-module 210 is to automatically resume the state for a new data review session for a user based on the session state data 259A,B. The configuration data 257 can be defined by user input, such as input received from an administrator user and/or a reviewer user. In another example, the state sub-module 210 can be configured to prompt a user upon detecting a request for new data review session for a reviewer user to determine whether to resume the state for a new data review session for the user. For example, the UI generator 225 can generate a window (e.g., pop-up window) and present the window in the UI 203 to request whether to resume the state for a new data review session for the user.

Figure 13:
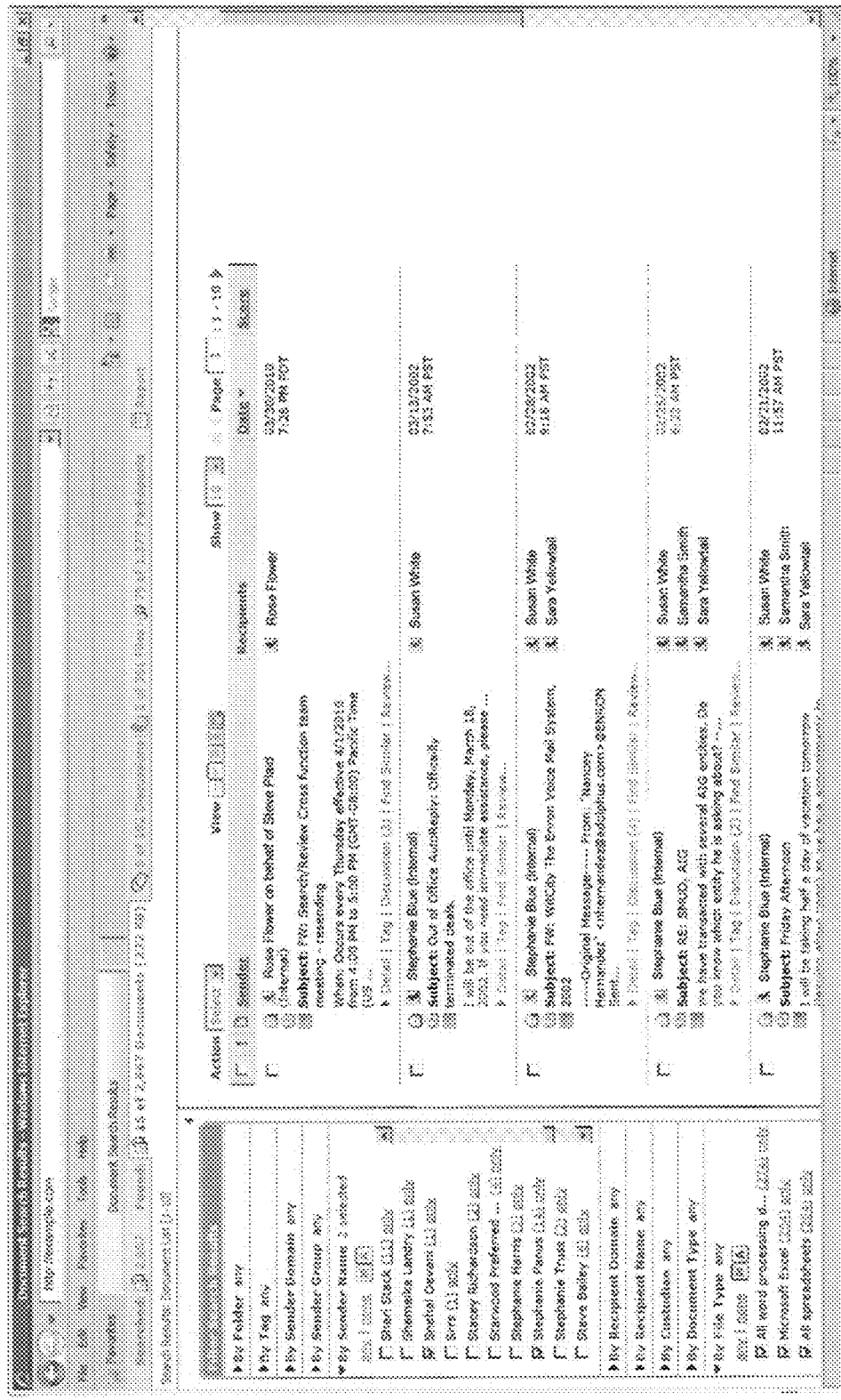

The state sub-module 210 can locate the next document to be reviewed by the reviewer user and configure the UI 203 based on the session state data 259A,259B. Embodiments of locating the next document to be reviewed are described in greater detail below in conjunction with FIG. 6 and FIG. 7. The state sub-module 210 can apply filter settings and highlighting settings that are stored in the session state data 259A,B to the new search results generated by the search sub-module 215. One embodiment of configuring the UI and applying saved filter and highlighting settings is described in greater detail below in conjunction with FIG. 6. FIG. 13 is an example GUI for filtering.

The search sub-module 215 can execute a new search based on the located session state data to generate a new set of search results, for example, subsequent to the session sub-module 205 detecting a request to initiate a new data review session for a reviewer user. The search sub-module 215 can determine whether there are differences between the new set of search results and the set of search results included in the session state data. One embodiment of a method for determining whether there are differences between the sets of search results is described in greater detail below in conjunction with FIG. 5. In one embodiment, the search sub-module 215 stores the new search results in a data store 250A,B.

The notification sub-module 220 can notify a user (e.g., reviewer user, administrator user) of whether there are differences between the sets of search results. For example, the UI generator 225 can generate a window (e.g., pop-up window) and present the window in the UI 203 to notify the user. In another example, the notification sub-module 220 can generate and send an email message, a text message, an instant message, a visual alert, and/or a sound alert to notify the one or more users.

The session sub-module 205 can initiate a new data review session for the reviewer user and the UI generator 225 can include the located next document to be reviewed in the UI 203. The reviewer user can resume his/her review at a point where the reviewer user stopped when the reviewer user previously logged out of the review system.

Figure 3:
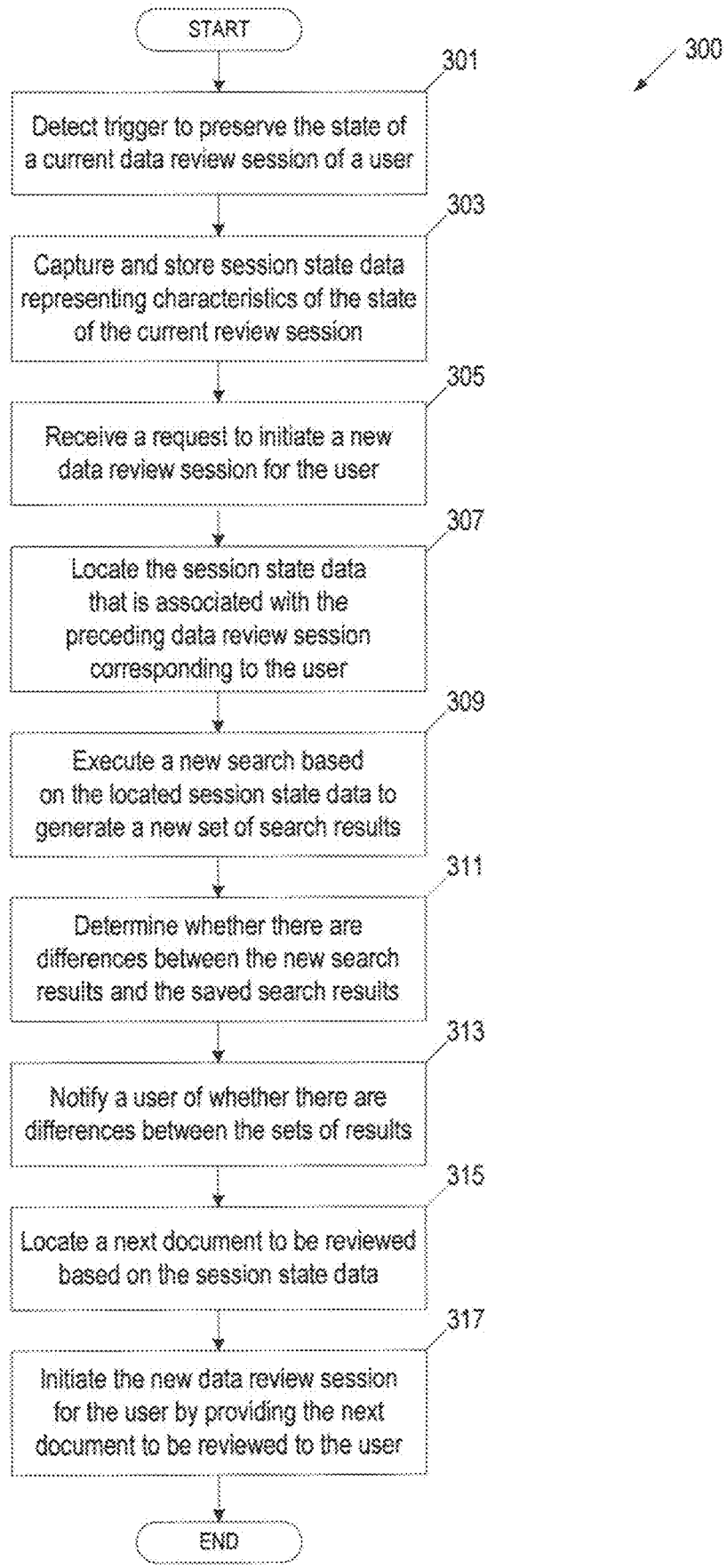
FIG. 3 is a flow diagram of an embodiment of a method for resuming a linear review of search results.

FIG. 3 is a flow diagram of an embodiment of a method 300 for resuming a linear review of search results. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a resume module 195 hosted by a review server 190 in FIG. 1A or FIG. 1B.

A reviewer user can be conducting a review of data in a current data review session. At block 301, processing logic detects a trigger to preserve the state of the current data review session of a user. For example, processing logic detects a session timeout or a user request. At block 303, processing logic captures and stores session state data representing characteristics of the state of the current data review session of the reviewer user. One embodiment of preserving session state data of a current data review session for a particular reviewer user is described in greater detail below in conjunction with FIG. 4.

At block 305, processing logic receives a request to initiate a new data review session for the reviewer user. For example, processing logic receives a user login request to login to the review system. At block 307, processing logic locates the session state data that is associated with the preceding data review session corresponding to the reviewer user. At block 309, processing logic executes a new search based on the located session state data to generate a new set of search results and determines whether there are differences between the new set of search results and the set of search results included in the session state data at block 311. One embodiment of determining whether there are differences between the sets of search results is described in greater detail below in conjunction with FIG. 5.

At block 313, processing logic notifies a user of whether there are differences between the sets of search results. At block 315, processing logic locates the next document to be reviewed by the reviewer user based on the session state data and initiates the new data review session for the reviewer user by providing the located next document to be reviewed in a user interface (e.g., web-based GUI) at block 317. One embodiment of providing the next document to be reviewed to the reviewer user is described in greater detail below in conjunction with FIG. 6. The reviewer user can resume his/her review at a point where the reviewer user stopped when the reviewer user previously logged out of the review system.

Figure 4:
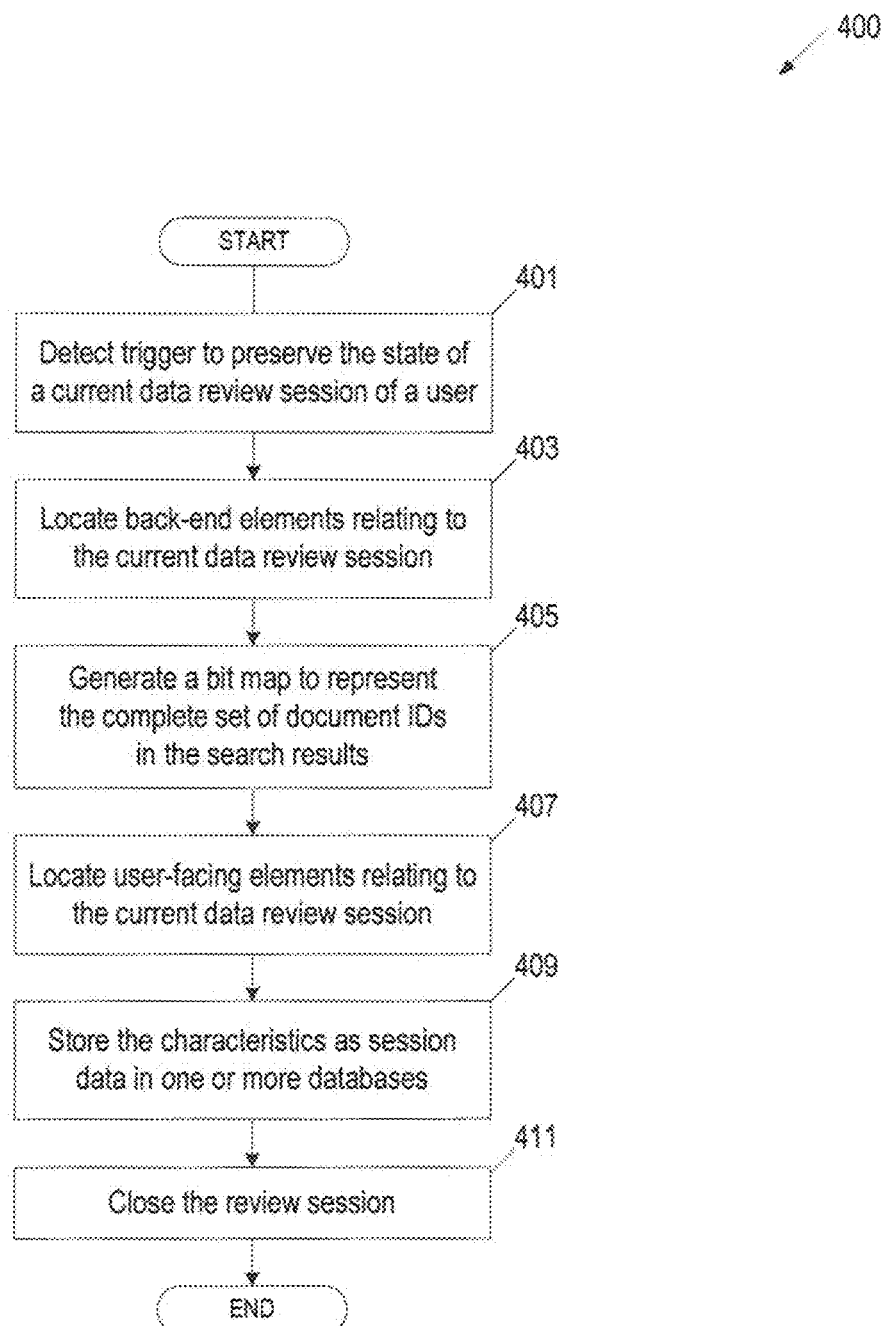
FIG. 4 is a flow diagram of an embodiment of a method for preserving state data of a current data review session for a reviewer user.

FIG. 4 is a flow diagram of an embodiment of a method 400 for preserving session state data of a current data review session for a reviewer user. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a resume module 195 hosted by a review server 190 in FIG. 1A or FIG. 1B.

Every document indexed by the review system is assigned a unique document identifier (ID). New documents can therefore be added at any time during the lifecycle of a case, as no new document ID will overwrite an existing document ID. At block 401, processing logic detects a trigger to preserve the state of the current data review session of a reviewer user and locates back-end elements relating to the current data review session of the reviewer user at block 403. Examples of back-end elements can include, and are not limited to, a user ID, a case ID, the identifier of a saved search, the search criteria of the search, the search filters that have been applied to the search, the search highlights that have been applied to the search, the set of saved search identifiers corresponding to the search criteria to use to perform additional highlighting of the search results, the document identifiers corresponding to the one or more documents included in the search results, the document identifiers corresponding to the one or more documents viewed by the user, the document identifiers corresponding to the one or more documents currently being reviewed by the user, the document identifiers corresponding to the one or more documents yet to be reviewed by the user, and the complete set of document IDs that comprise the set of search results.

Processing logic can locate and capture a number of next document IDs based on, for example, the display mode in which a user is using the review system. The number can be based on the number of documents displayed on the page of results the user was viewing at the time he/she logged out or a session time out occurred. In one example, the user may be using Review Mode, which displays only one message per page. In another example, the user may be using List Mode, which allows the user to elect to view more than one message per page, such as 5, 10, 25, 50, or 100 messages per page. In one embodiment, processing logic captures the IDs of every document on the current page, as well as the first document on the next page. According to one embodiment, processing logic captures more than one document ID in the event that the document(s) the user was actually viewing is not subsequently in the set of search results when the user later logs back in. In one embodiment, processing logic does not capture the ID of every document the user has not yet seen, as the search results may be many in number. The next document IDs can be stored as a list of next document IDs. In one embodiment, the list of next document IDs contains between 2 and 101 document IDs. The number is based on the number of documents displayed on the page of results the user was viewing at the time he/she logged out or a session time out occurred.

At block 405, processing logic generates a bit map to represent the complete set of document IDs that comprise the set of search results. At block 407, processing logic locates user-facing elements relating to the current data review session of the reviewer user. Examples of user-facing elements can include, and are not limited to, the sort criteria and sort direction to use when displaying the search results of the search in a user interface, the display mode to use to display the search results, the display parameters for the display mode, and the sizes and positions of the control panels in the user interface. Examples of display modes can include, and are not limited to, a review mode and a list mode. Examples of the display mode parameters can include, and are not limited to, a number of results to be displayed per page in the graphical user interface, a quantity of data for each search hit to display, and the sizes and positions of the control panels.

At block 409, processing logic stores the characteristics (e.g., back-end elements, user-facing elements, bit map) as session state data in one or more databases that are hosted by data stores that are coupled to the processing logic. In one embodiment, processing logic stores at least a portion of the session state data in a master case database and at least a portion of the session state data in a case database. A master case is a case that applies across all cases. A master case database stores data associated with a master case. A case database stores database for a particular case. A case database can be in a separate data store from the master database. There can be more than one case database stored in one or more data stores.

Processing logic can store the user identifier of the user and the case identifier of the case which the user is currently reviewing in the master case database, and can store the user ID, case ID, the review system back-end elements, and the review system user-facing elements in the case database of the case. The session state data that is stored in the one or more databases (e.g., master case database, case databases) can be keyed by the user unique identifier. In one embodiment, at block 411, processing logic closes the data review session of the reviewer user.

Figure 5:
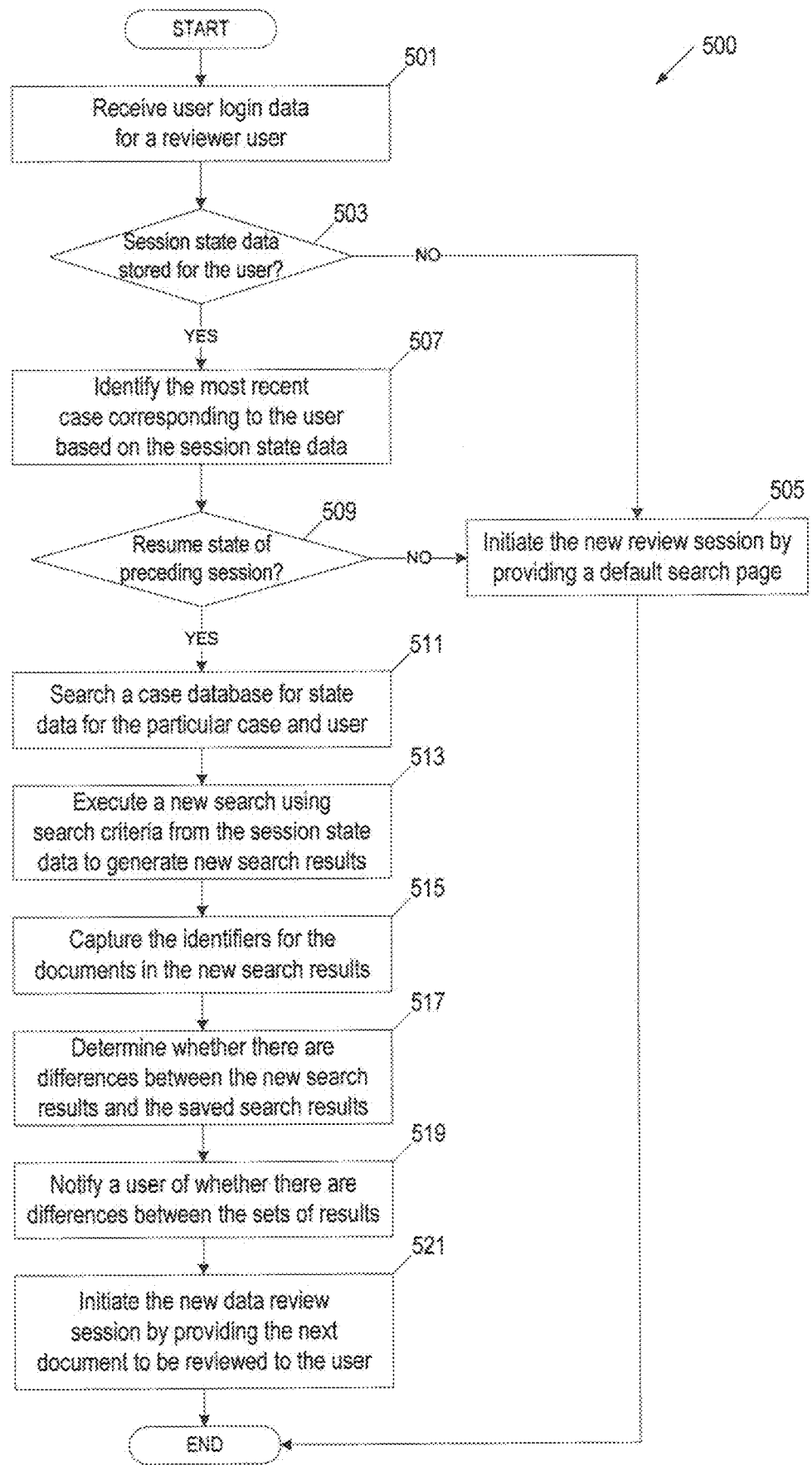
FIG. 5 is a flow diagram of an embodiment of a method for providing a new data review session to a user based on state data of the preceding data review session of the user.

FIG. 5 is a flow diagram of an embodiment of a method 500 for providing a new data review session to a reviewer user based on state data of the preceding data review session of the reviewer user. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by a resume module 195 hosted by a review server 190 in FIG. 1A or FIG. 1B.

Figure 10:
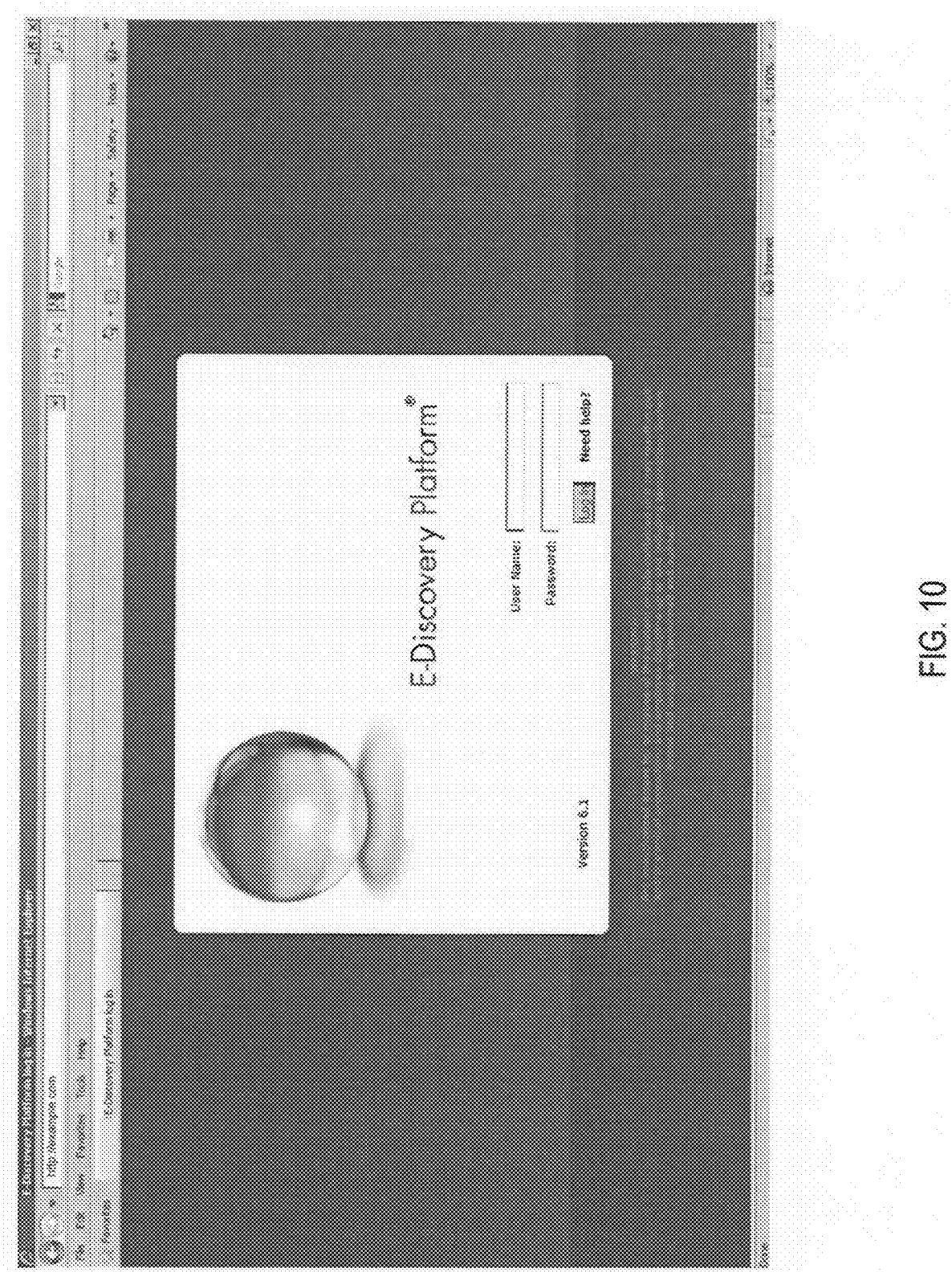
FIGS. 10-13 are example GUIs for reviewing documents.

Processing logic can present a GUI for a user to log into the review system. FIG. 10 is an exemplary GUI for a login page. At block 501, processing logic receives user login data for a reviewer user. The login data can include a user identifier (ID). At block 503, processing logic determines whether there is session state data for the reviewer user stored in a data store that is coupled to the processing logic. Processing logic can search a master database for an entry that corresponds to the user ID in the login data. The entries of the master database can be for more than one reviewer user and can be keyed by user ID. Processing logic can search the master database for a user ID that matches the user ID in the request. If there is not a user ID in the master database that matches the user ID in the request (block 503), processing logic initiates a new data review session for the user by providing a default search page in a user interface to the reviewer user at block 505. FIG. 11 is an exemplary GUI for a default search page. A default search page can present a search user interface without any active searches or any search results.

Returning to FIG. 5, in one embodiment, reviewer users are associated with more than one case and if there is a user ID in the master database that matches the user ID in the request (block 503), processing logic identifies the most recent case that is associated with the user based on the session state data at block 507. For example, a reviewer user may be associated with previous cases and/or working concurrently on multiple cases. Processing logic can identify one or more entries in the master database having the user ID that matches the user ID in the request and can use a timestamp for each entry to identify the most recent case associated with the user ID.

At block 509, processing logic determines whether to resume the state of the preceding data review session. Processing logic can send a request to a reviewer user to determine whether to resume the state of the preceding data review session. If processing logic receives user input indicating not to resume the state of the preceding data review session (block 509), processing logic initiates a new data review session for the reviewer user by providing a default search page in a user interface to the reviewer user at block 505. If processing logic receives user input indicating to resume the state of the preceding data review session (block 509), processing logic obtains the session state data for this particular case and reviewer user based on the case ID and user ID at block 511. In another embodiment, processing logic obtains the session state data for this particular reviewer user based user ID if the user is associated with a single case at block 511. In one embodiment, the session state data for the particular case and user is stored in a case database of the case. The case database can be stored in a data store that is coupled to the processing logic. Processing logic can locate the case database using the case ID and can search the case database for the session state data based on the user ID. In another embodiment, the session state data for a particular case and reviewer user is stored the master database.

At block 513, processing logic executes a new search using a search ID and search criteria that are stored in the session state data to generate new search results. The new search results can include documents not found previously if new data was added to the case or if existing documents now match the search criteria because tags were added or removed, for example, by other reviewer users, since the user last logged in. The new search results can exclude documents found previously because tags were added or removed since the reviewer user last logged in. At block 515, processing logic captures the IDs (e.g., document IDs) of the documents that are in the new search results. Processing logic can generate a bit map to represent the set of IDs of the documents the set of new search results.

At block 517, processing logic determines whether the new search results are different from the search results included in the session state data. The new search may produce different search results because, for example, new documents that satisfy the search criteria were collected from data sources since the reviewer user last logged into the review system. In another example, the content of the collected documents may have changed, such that, a document no longer satisfies the search criteria, thus causing the new search results to be different. Processing logic can compare the IDs in the bit map for the new search results against the IDs in the bit map stored in the session state data. The bitmap stored in the session state data represents items from a search when the reviewer user last logged out of the review system. Processing logic can use simple Boolean logic between the bit sets that make up the bit maps to determine whether there are any differences in the sets of IDs.

At block 519, processing logic notifies a user (e.g., reviewer user, administrator user) of whether there are differences between the sets of search results. In one embodiment, processing logic generates and displays a window in a GUI indicating whether or not the search results have changed. In one embodiment, the notification includes the IDs (e.g., document IDs) that are new and/or are no longer present. In one embodiment, processing logic does not notify a user if the search results are the same.

At block 521, processing logic automatically locates the next document to be reviewed based on the stored session state data and initiates the new data review session for the reviewer user by providing the located next document to be reviewed in a user interface (e.g., web-based GUI). One embodiment of providing the next document to be reviewed to the reviewer user is described in greater detail below in conjunction with FIG. 6.

Figure 6:
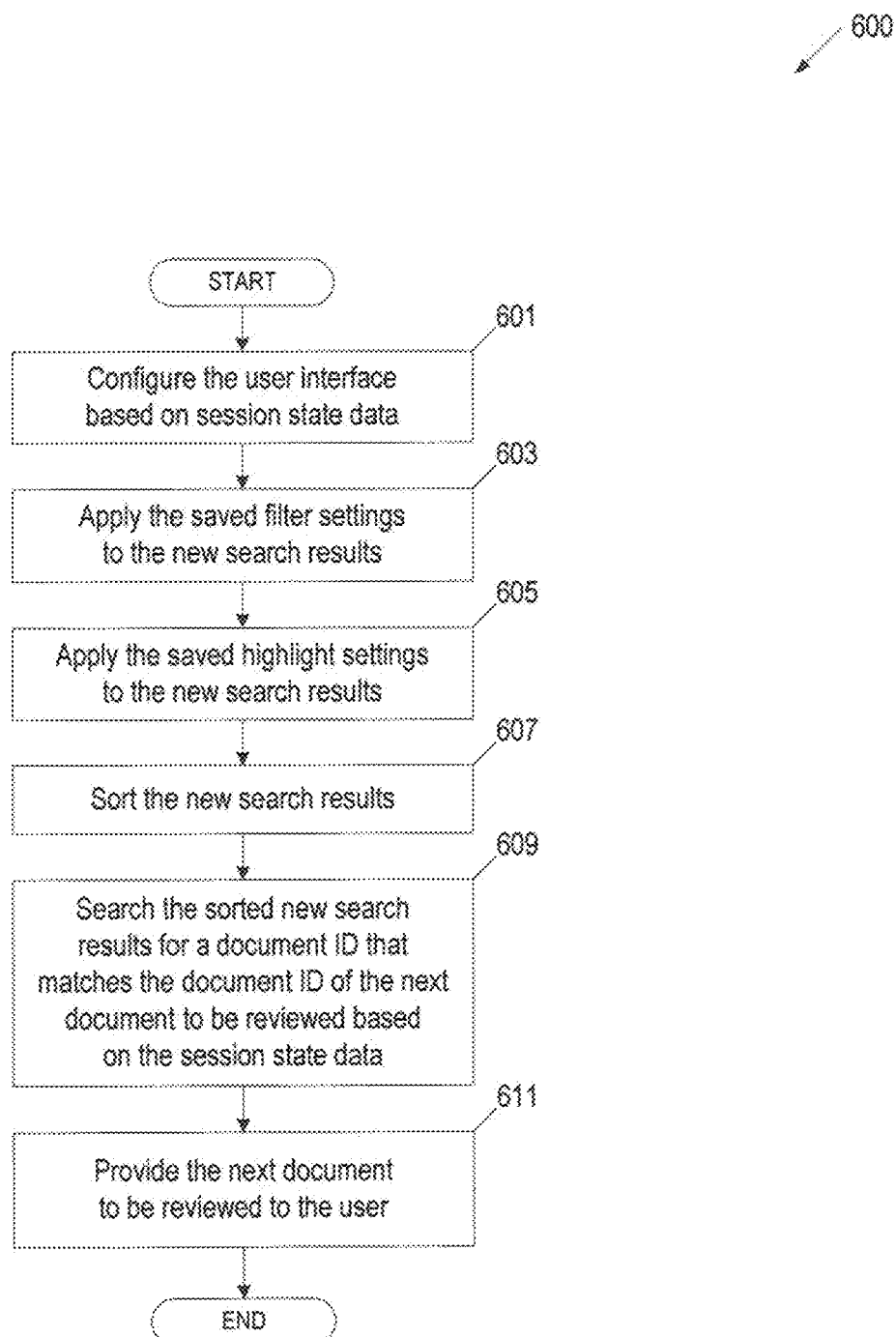
FIG. 6 is a flow diagram of an embodiment of a method for automatically providing a next document to be reviewed to the reviewer user.

FIG. 6 is a flow diagram of an embodiment of a method 600 for automatically providing a next document to be reviewed to the reviewer user. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by a resume module 195 hosted by a review server 190 in FIG. 1A or FIG. 1B.

In one embodiment, processing logic has already obtained session state data for a particular user and a particular case, has executed a new search based on the session state data, and has captured the identifiers (IDs) (e.g., document IDs) of the documents that are in the new search results in a bit map.

At block 601, processing logic configures a user interface (e.g., web-based GUI) based on the session state data. For example, processing logic resizes the panels on the user interface (UI) based on the parameters in the session state data. At block 603, processing logic applies the filter settings stored in the session state data to the new search results and applies the highlight settings stored in the session state data to the filtered search results at block 605. At block 607, processing logic sorts the new search results based on the sort criteria and sort direction stored in the session state data.

At block 609, processing logic searches through the sorted search results for the ID of the next document to be reviewed based on the session state data. In one embodiment, the next document to be reviewed is based on the mode which the reviewer was using in the review system. If a reviewer user was previously reviewing data in Review Mode, the next document to be reviewed is the document that the reviewer user was viewing before the reviewer user logged out of the review system. If a reviewer user was previously reviewing data in List Mode, the next document to be reviewed is the first document on the page (e.g., web page) of search results that was last viewed by the reviewer user. Processing logic can determine which mode the reviewer user was using from the session state data. If a reviewer user was previously in Review Mode, processing logic searches the sorted search results for the ID of the document that the user was viewing before the reviewer user logged out of the review system. The session state data can include the ID of the document that the reviewer user was viewing before the reviewer user logged out. If a reviewer user was previously reviewing data in List Mode, processing logic searches the sorted search results for the ID of the first document on the page of search results that was last viewed by the reviewer user. At block 611, processing logic provides the next document to be reviewed to the reviewer user. One embodiment of locating and providing the next document to be reviewed is described in greater detail below in conjunction with FIG. 7.

Figure 7:
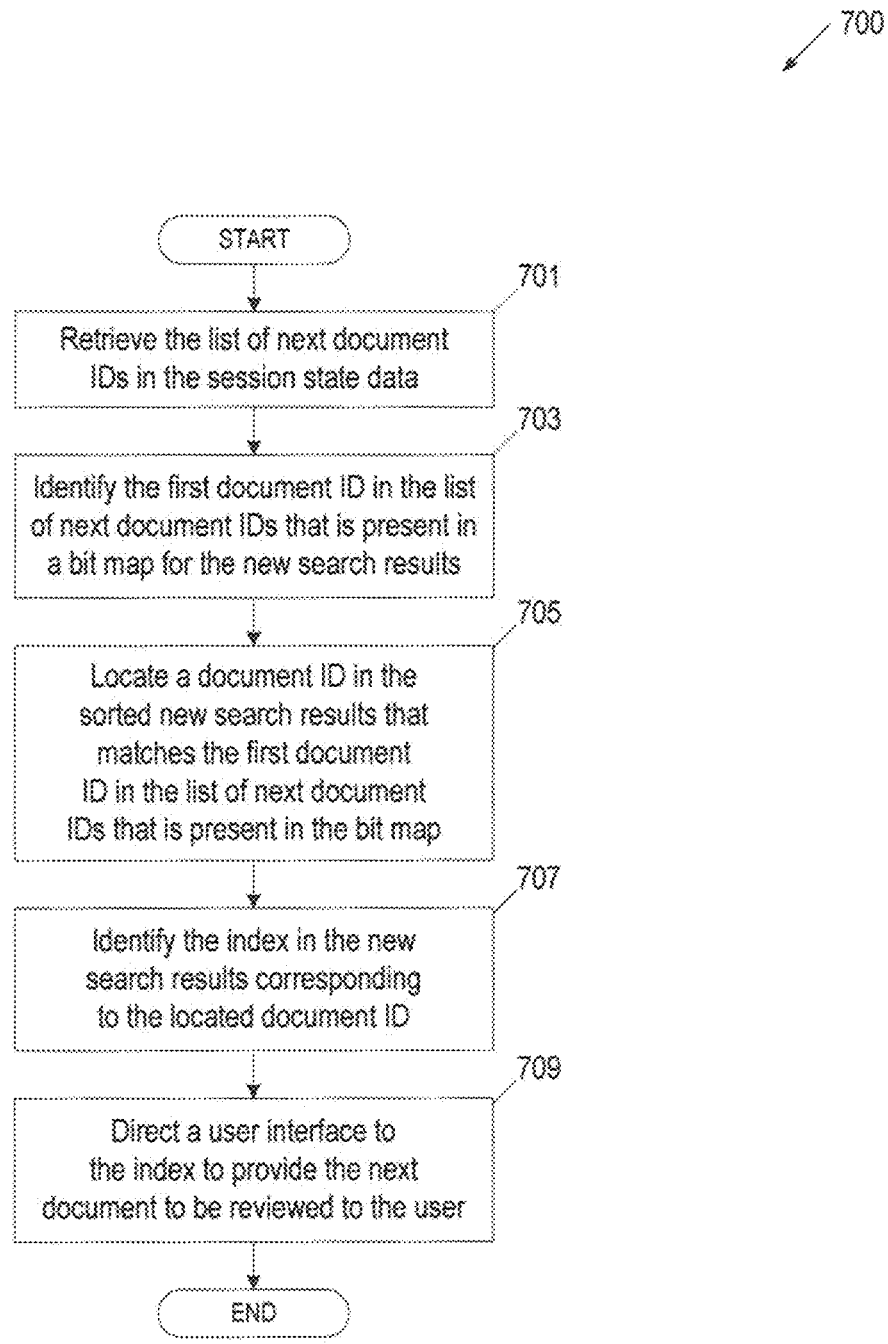
FIG. 7 is a flow diagram of an embodiment of a method for automatically providing a next document to be reviewed to the reviewer user.

FIG. 7 is a flow diagram of an embodiment of a method 700 for automatically providing the next document to be reviewed. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by a resume module 195 hosted by a review server 190 in FIG. 1A or FIG. 1B.

By applying the sort criteria and the sort direction to new search results, processing logic can locate the next document to be reviewed in the sorted search results. The index of a document is the location of the document in the new search results once the sort criteria and sort direction have been applied to the new search results. In one embodiment, the resume module does not save the previous index of a document, since the index will likely have changed if a new search returns different results. Processing logic can execute method 700 to identify the index to be used to fetch and provide the next document to be reviewed.

At block 701, processing logic retrieves a list of next document IDs from the stored session state data to determine the document index to which the reviewer user should be taken to. For example, processing logic retrieves a list of 2 to 101 next document IDs from the session state data. At block 703, processing logic identifies the first ID in the list of next document IDs that is present in the new search results (e.g., present in the bit map for the new search results). Processing logic iterates through the IDs in the list of next document IDs, checking the bit map for new search results (e.g., compressed data structure of IDs that comprise the new search results) for each ID in the list of next document IDs, until processing logic identifies a document ID in the list of next document IDs that is present in the new search results (e.g., present in the bit map for the new search results). The first document ID that is identified as present in the bit map for the new search results is hereinafter referred to as the document ID for a "current document." The current document represents the next document to be reviewed.

Figure 8:
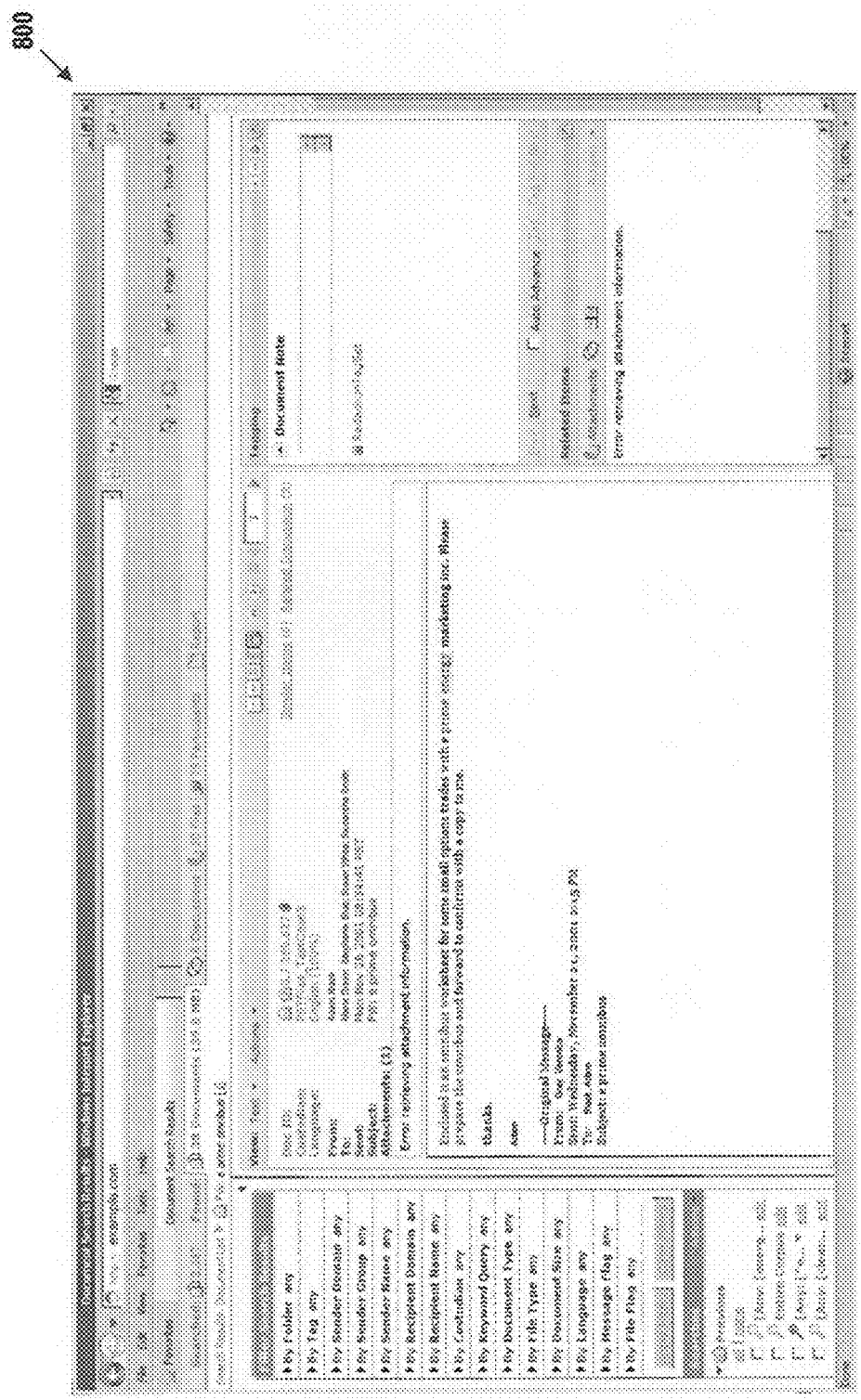
FIG. 8 is an exemplary graphical user interface (GUI) for providing a next document to be reviewed in Review Mode.

At block 705, processing logic iterates through the sorted new search results (e.g., new search results sorted by the sort criteria and the sort direction stored in the session state data) until the document ID for the current document is located. When the document ID for the current document is located, processing logic identifies the index of the current document at block 707. Processing logic can use the index of the current document as the index for the next document to be reviewed. At block 709, processing logic directs a user interface (UI) to the index to provide the next document to be reviewed to the user. For example, the UI can use the index to include the next document to be reviewed in the UI. For instance, a reviewer user may have used Review Mode and the next document to be reviewed is presented in a GUI. FIG. 8 illustrates an exemplary graphical user interface (GUI) 800 providing a next document to be reviewed in Review Mode.

Figure 9:
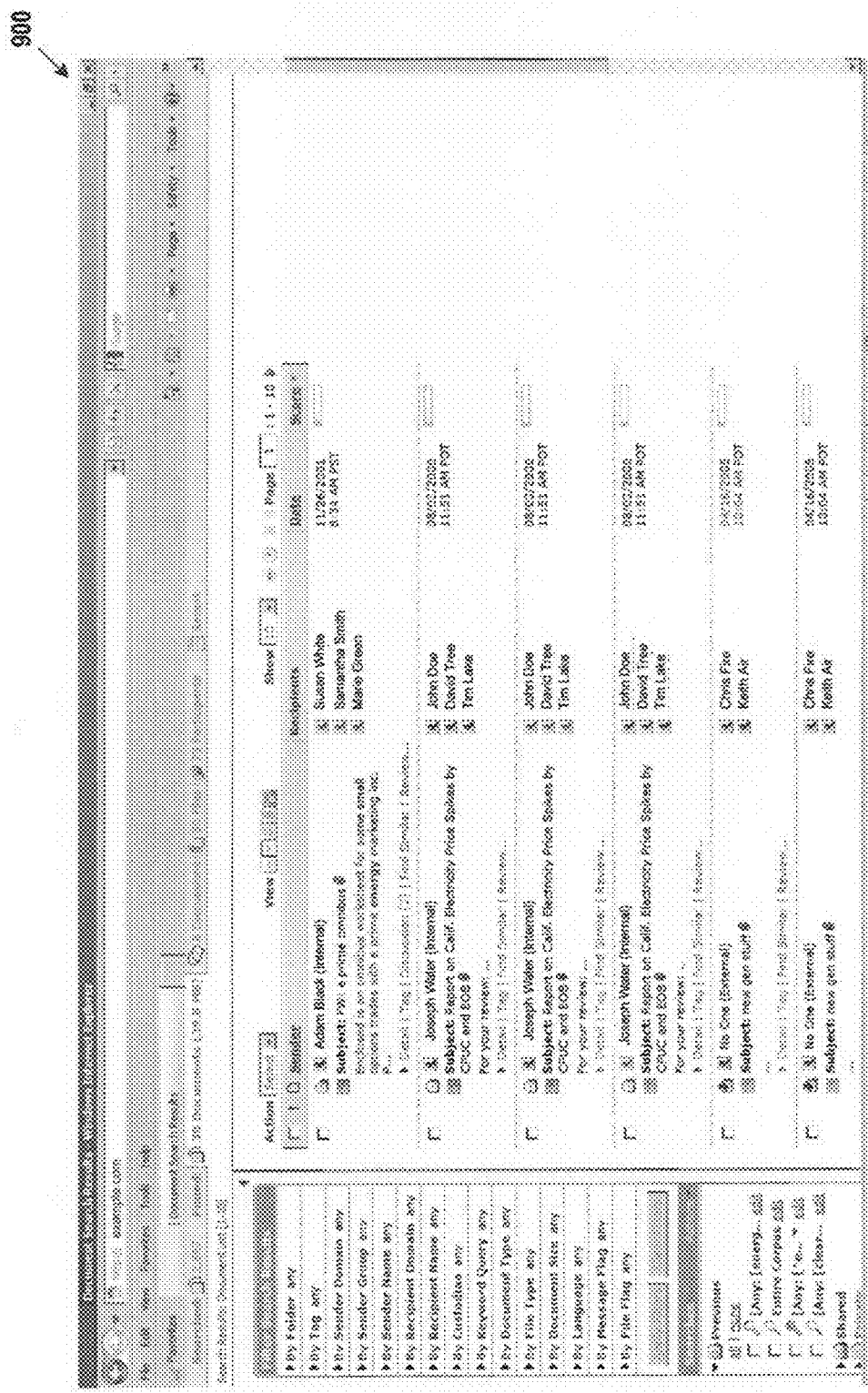
FIG. 9 is an exemplary GUI for providing a next document to be reviewed as one of the documents in a current page in List Mode.

In another example, the index can be used by the UI to fetch the appropriate range of messages (e.g., documents) to fill and provide a "current page," such that the current document (or next document to be reviewed) is one of the documents displayed in the current page. An example of a current page is a page of search results. For example, a reviewer user may have used List Mode and the next document to be reviewed is the one of the documents (e.g., first document) on the current page (e.g., web page) of search results. For instance, the next document to be reviewed is one of between 1 to 100 documents displayed on the current page. FIG. 9 illustrates an exemplary GUI 900 providing a next document to be reviewed as one of the documents in a current page in List Mode.

Figure 14:
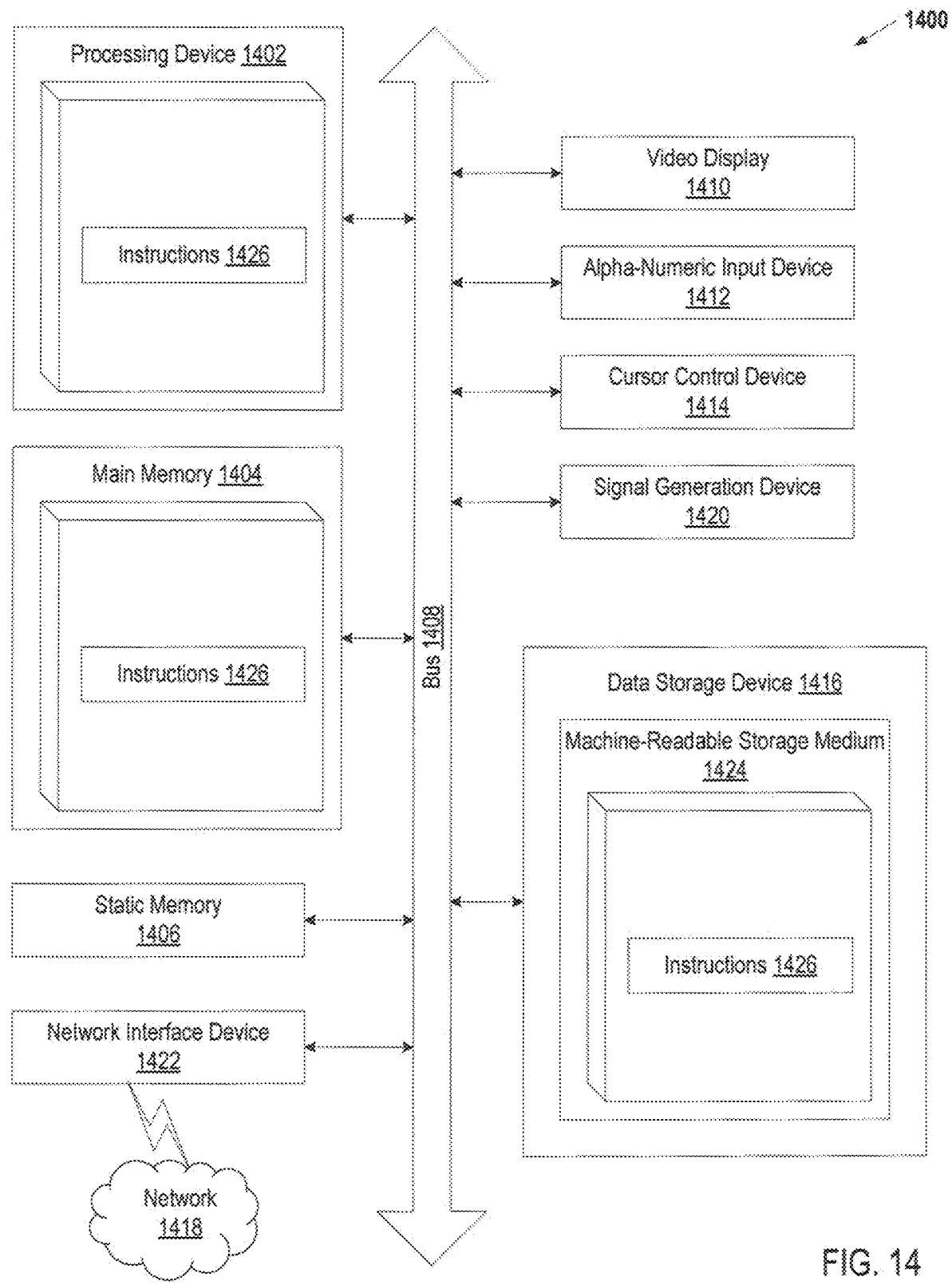
FIG. 14 is a diagram of one embodiment of a computer system for resuming a linear review of search results.

FIG. 14 is a diagram of one embodiment of a computer system for automatically resuming linear data review of search results. Within the computer system 1400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1400 includes a processing device 1402, a main memory 1404 (e.g., read-only memory (ROM), flash memory, dynamic random access memory (DRAM) such as synchronous DRAM (SDRAM) or DRAM (RDRAM), etc.), a static memory 1406 (e.g., flash memory, static random access memory (SRAM), etc.), and a secondary memory 1416 (e.g., a data storage device in the form of a drive unit, which may include fixed or removable computer-readable storage medium), which communicate with each other via a bus 1408.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. Processing device 1402 is configured to execute the instructions 1426 for performing the operations and steps discussed herein.

The computer system 1400 may further include a network interface device 1422. The computer system 1400 also may include a video display unit 1410 (e.g., a liquid crystal display (LCD) or a cathode ray tube (CRT)) connected to the computer system through a graphics port and graphics chipset, an alphanumeric input device 1412 (e.g., a keyboard), a cursor control device 1414 (e.g., a mouse), and a signal generation device 1420 (e.g., a speaker).

The secondary memory 1416 may include a machine-readable storage medium (or more specifically a computer-readable storage medium) 1424 on which is stored one or more sets of instructions 1426 embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media. The instructions 1426 may further be transmitted or received over a network 1418 via the network interface device 1422.

The computer-readable storage medium 1424 may also be used to store the instructions 1426 persistently. While the computer-readable storage medium 1424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 1426, components and other features described herein (for example in relation to FIG. 2) can be implemented as discrete hardware components or integrated in the functionality of hardware components such as ASICS, FPGAs, DSPs or similar devices. In addition, the instructions 1426 can be implemented as firmware or functional circuitry within hardware devices. Further, the instructions 1426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "locating," "providing," "executing," "notifying," "sorting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically resuming linear data review of search results is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to resume a review of documentary evidence, comprising:
    receiving an input, by an administrator user, to group a set of documents into review sets and assign the review sets to at least one reviewer user;
    receiving, by a processing device, a request to initiate a new electronic discovery data review session in which documentary evidence is reviewed by a reviewer user and marked to categorize the documentary evidence, the new electronic discovery data review session to relate to a review set of documentary evidence data that is assigned to an electronic discovery case, the request comprising a reviewer user identifier associated with a preceding electronic discovery data review session that is associated with the electronic discovery case;
    locating session state data associated with the preceding electronic discovery data review session using the user identifier, wherein the session state data comprises a list of next document identifiers, filter settings of the preceding electronic discovery data review session, and a bitmap representing a complete set of document identifiers of documents from prior search results;
    upon initiation of the new electronic discovery data review session, executing a new search based on the session state data to generate new search results associated with the review set, wherein the new search results are determined using a same query as the preceding electronic discovery data review session;
    upon initiation of the new electronic discovery data review session, determining whether there is at least one difference between the new search results and search results determined using the same query in the preceding electronic discovery data review session based upon a bitmap comparison;
    notifying the reviewer user when there is at least one difference;
    performing a linear review of the documentary evidence by automatically providing a next item of documentary evidence data for review in response to the reviewer user marking a current item of documentary evidence data, including:
        locating a next item of documentary evidence data to be reviewed based on the session state data by iterating through the list of next document identifiers to identify a first document identifier that is present in the new search results; and
        providing the next item of documentary evidence data in a graphical user interface when initiating the new electronic discovery data review session for the reviewer user;
        wherein locating the next item of documentary evidence data to be reviewed includes sorting new search results based on sort criteria and sort direction in the session state data; and
        locating the next item of documentary evidence data to be reviewed in the sorted new search results based on a display mode in the session state data.

2. The method of claim 1, wherein the review session is a linear review.

3. The method of claim 1, wherein the session state data comprises back-end elements pertaining to the preceding electronic discovery data review session, wherein the back-end elements comprise at least one of the reviewer user identifier, a saved search identifier, search criteria, search filter settings, search highlighting settings, or document identifiers.

4. The method of claim 1, wherein the documentary evidence data that is assigned to the electronic discovery case comprises at least one of an email message, an instant message, a text message, a voicemail message, or a document that is assigned to the electronic discovery case.

5. A system to resume a review of documentary evidence, comprising:
    a memory; and
    a processing device coupled with the memory to:
        receive an input, by an administrator user, to group a set of documents into review sets and assign the review sets to at least one reviewer user;
        receive a request to initiate a new electronic discovery data review session, in which documentary evidence is reviewed by a reviewer user in a linear review and marked to categorize the documentary evidence, the new electronic discovery data review session to relate to a review set of documentary evidence data that is assigned to an electronic discovery case, the request comprising a reviewer user identifier associated with a preceding electronic discovery data review session that is associated with the electronic discovery case;
        locate session state data associated with the preceding electronic discovery data review session using the reviewer user identifier, wherein the session state data comprises a list of next document identifiers, filter settings of the preceding electronic discovery data review session, and a bitmap representing a complete set of document identifiers of documents from prior search results;
        upon initiation of the new electronic discovery data review session, execute a new search based on the session state data to generate new search results associated with the review set, wherein the new search results are determined using a same query as the preceding electronic discovery data review session;
        upon initiation of the new electronic discovery data review session, determine whether there is at least one difference between the new search results and search results determined using the same query in the preceding electronic discovery data review session based upon a bitmap comparison;

notify the reviewer user when there is at least one difference;

performing a linear review of the documentary evidence by automatically providing a next item of documentary evidence data for review in response to the reviewer user marking a current item of documentary evidence data, including:

locate a next item of documentary evidence data to be reviewed based on the session state data by iterating through the list of next document identifiers to identify a first document identifier that is present in the new search results; and provide the next item of documentary evidence data to be reviewed of the review set in a graphical user interface when initiating the new electronic discovery data review session for the reviewer user, wherein the new electronic discovery data review session is based on the filter settings in the session state data;

wherein locating the next item of documentary evidence data to be reviewed includes sorting new search results based on sort criteria and sort direction in the session state data; and locating the next item of documentary evidence data to be reviewed in the sorted new search results based on a display mode in the session state data.

6. The system of claim 5, wherein the review session is a linear review.

7. The system of claim 5, wherein the session state data comprises back-end elements pertaining to the preceding electronic discovery data review session, wherein the back-end elements comprise at least one of the reviewer user identifier, a saved search identifier, search criteria, search filter settings, search highlighting settings, or document identifiers.

8. The system of claim 5, wherein the documentary evidence data that is assigned to the electronic discovery case comprises at least one of an email message, an instant message, a text message, a voicemail message, or a document that is assigned to the electronic discovery case.

9. A non-transitory computer readable storage medium including instructions that, when executed by a processor, cause the processor to perform operations comprising:

receiving an input, by an administrator user, to group a set of documents into review sets and assign the review sets to at least one reviewer user;

receiving, by the processor, a request to initiate a new electronic discovery data review session in which documentary evidence is reviewed by a reviewer user in a linear review and marked to categorize the documentary evidence, the new electronic discovery data review session to relate to a review set of documentary evidence data that is assigned to an electronic discovery case, the request comprising a reviewer user identifier associated with a preceding electronic discovery data review session that is associated with electronic discovery case;

locating session state data associated with the preceding electronic discovery data review session using the reviewer user identifier, wherein the session state data comprises a list of next document identifiers, filter settings of the preceding electronic discovery data review session, and a bitmap representing a complete set of document identifiers of documents from prior search results;

upon initiation of the new electronic discovery data review session, executing a new search based on the session state data to generate new search results associated with the review set, wherein the new search results are determined using a same query as the preceding electronic discovery data review session;

upon initiation of the new electronic discovery data review session, determining whether there is at least one difference between the new search results and search results determined using the same query in the preceding electronic discovery data review session based upon a bitmap comparison;

notifying the reviewer user when there is at least one difference;

performing a linear review of the documentary evidence by automatically providing a next item of documentary evidence data for review in response to the reviewer user marking a current item of documentary evidence data, including:

locating a next item of documentary evidence data to be reviewed based on the session state data by iterating through the list of next document identifiers to identify a first document identifier that is present in the new search results; and providing the next item of documentary evidence data to be reviewed of the review set in a graphical user interface when initiating the new electronic discovery data review session for the reviewer user, wherein the new electronic discovery data review session is based on the filter settings in the session state data;

wherein locating the next item of documentary evidence data to be reviewed includes sorting new search results based on sort criteria and sort direction in the session state data; and locating the next item of documentary evidence data to be reviewed in the sorted new search results based on a display mode in the session state data.

10. The non-transitory computer readable storage medium of claim 9, wherein the review session is a linear review.

11. The non-transitory computer readable storage medium of claim 9, wherein locating the next item of documentary evidence data to be reviewed in the sorted new search results based on the display mode comprises at least one of:

determining the display mode is a first mode, wherein the next item of documentary evidence data to be reviewed is a document that was last viewed before the reviewer user ended the preceding electronic discovery data review session; or determining the display mode is a second mode, wherein the next item of documentary evidence data to be reviewed is a first document on a page of the search results last viewed before the reviewer user ended the preceding electronic discovery data review session.

12. The non-transitory computer readable storage medium of claim 9, wherein the session state data comprises:

back-end elements pertaining to the preceding electronic discovery data review session, wherein the back-end elements comprise at least one of the reviewer user identifier, a saved search identifier, search criteria, search filter settings, search highlighting settings, or document identifiers; and user-facing elements pertaining to the preceding electronic discovery data review session, wherein the reviewer user-facing elements comprise at least one of sort criteria, sort direction, a display mode, or display parameters.

* * * * *